Patented June 6, 1933

1,912,399

UNITED STATES PATENT OFFICE

SERENO G. NORTON AND NEWTON C. BOYD, OF KENVIL, NEW JERSEY, ASSIGNORS TO HERCULES POWDER COMPANY, OF WILMINGTON, DELAWARE, A CORPORATION OF DELAWARE

METHOD OF PURIFYING ALIPHATIC ORGANIC NITRATES

No Drawing.   Application filed May 10, 1928.   Serial No. 276,807.

Our invention relates to a method for purifying nitrated products and more particularly relates to a method for the neutralization of nitrated products and is more especially adaptable to the treatment of nitrated products which are normally in a liquid state or which may be rendered liquid so as to permit intimate contact.

Our invention relates more specifically to a method for neutralizing nitroglycerin, nitroglycols, nitrated polymerized glycerin and glycols, nitrated chlorohydrins, nitrated sugars, as saccharose, glucose, mannose, xylose, or other sugars, nitrated starch, or nitrocellulose, or mixtures of any two or more thereof. When nitrocellulose, nitrated sugars or nitrated starch are treated they may desirably be rendered liquid by solution in some medium, as alcohol, or may be treated in solution in a liquid nitrated product, so that intimate contact may be obtained.

Heretofore in the purification of nitrated products it has been customary to subject the product, after separation from the bulk of the nitrating acids, to a washing with pure water and then to washing with an aqueous solution of sodium carbonate. Alternatively, such products have been purified by repeated washings with pure water.

The treatment of nitrated products with sodium carbonate solution has substantial disadvantage in that the sodium carbonate promotes emulsion of the wash water in the nitrated product so that it is often necessary to rewash with sodium chloride solution in order to obtain a product dry enough for use. Further, the use of sodium carbonate reduces the stability of the product and the reduction is persistent, since repeated washing with fresh water after the sodium carbonate wash does not improve the stability. Further, such products, on standing for a few days after the sodium carbonate wash, will be found to be slightly acid instead of absolutely neutral as is desirable. Further, some carbonic acid, liberated from the sodium carbonate by the neutralizing reaction, is absorbed by and retained in the product and it cannot be removed by washing with water.

Now, in accordance with our invention, we provide a method whereby nitrated products may be purified or neutralized and brought to an absolute neutrality, or a pH value of 7.0, and at the same time rendered very stable. In accordance with our invention, we subject a nitrated product to washing with an alkaline solution of a salt, or mixture of salts, which do not contain the carbonic acid radical, or other substance which released to the nitrated product will promote decomposition thereof, which have a high solubility in water, which have a relatively slight or no saponification effect upon the nitrated product treated and which during the major part of the treatment of the nitrated product or neutralization process will have a pH value not in excess of about 12.0 and not below about 8.3.

In the selection of a salt for use in carrying out the method in accordance with our invention, salts whose acid radical will be released to the nitrated product and will promote decomposition thereof, such, for example in the case of nitroglycerin, as salts having the radicals $H_2CO_3$ and $H_2S$ should not be used, nor should caustic alkalies, as for example, sodium hydroxide, which have the effect of saponifying the nitrated product, be used alone.

In the carrying out of the method according to our invention, for example, salts, as soluble tribasic phosphates, for example, trisodium phosphate $Na_3PO_4$, tri-potassium phosphate $K_3PO_4$, or sodium diammonium phosphate $Na(NH_4)PO_4$; sodium tetraborate $Na_2B_4O_7$, potassium tetraborate $K_2B_4O_7$; or ammonium tetraborate $(NH_2)B_4O_7$; and salts as, for example, sodium borate, sodium metaborate $Na_2B_2O_4$; and the like will be found to give satisfactory results. Such salts are desirably used in dilute aqueous solution and may be used in combination, or in combination with neutral or acid salts, or with alkali hydroxides, which will not release to the nitrated product a substance which will promote its decomposition and which in combination give solutions which during the major part of the neutralizing process will fall within the indicated limits of pH value, i. e. 12.0–8.3.

By way of example, a solution of a soluble tribasic phosphate, as trisodium phosphate having a pH value of about 12.5 will be rapidly reduced to a pH value of 12.0 when the neutralizing process begins and may all be converted into disodium phosphate before the pH value reaches 8.3. In the use of trisodium phosphate solution alone, some slight saponification will occur and it is preferable to use it in combination with sodium borate to a point where the solution will have an initial pH value of 12.0. A sodium borate solution, for example, will have a pH value of 9.3 and will be about fifty per cent exhausted before the pH value reaches 8.5. A mixture of 75% trisodium phosphate and 25% sodium borate has a pH value of about 11.7 when in solution and may be 90% exhausted before reaching a pH value of 8.5. This mixture is a milder wash than straight trisodium phosphate and is nearly as efficient.

While, as has been indicated, caustic alkalies, as sodium hydroxide, alone are unsatisfactory for neutralizing nitrated products, as nitroglycerin, because they cause loss by saponification, by combining, for example, sodium hydroxide with, for example, sodium borate, trisodium phosphate, or the like, the saponifying action is substantially prevented. A suitable mixture of sodium hydroxide and sodium borate may, for example, consist of 1 part by weight of sodium hydroxide and 2 parts of sodium tetraborate ($Na_2B_4O_7.10H_2O$). When dissolved in 100 parts of water this mixture forms a solution of sodium metaborate ($Na_2B_2O_4$) plus some free sodium hydroxide. It has an initial pH value of about 12.3, which is reduced very quickly to 12.0 and it may be completely exhausted before a pH value of 8.3 is reached.

As an example of the practical adaptation of our process to the treatment of, for example, nitroglycerin, a quantity of nitroglycerin, after separation from the spent acid, is given a preliminary wash in one-half its volume of water at 100° F. After settling, the wash water is removed and a second wash is given, consisting of one-half volume of a solution containing, for example, 8% of trisodium phosphate ($Na_3PO_4.12H_2O$) and 2% of a soluble tetraborate, as sodium tetraborate ($Na_2B_4O_7.10H_2O$), at 100° F. The strength of the solution may be adjusted to allow for various amounts of dissolved acid carried into this wash by the nitroglycerin. After agitating the nitroglycerin in the above wash, by any suitable means, such as compressed air, for 15 minutes or more, the nitroglycerin is allowed to settle and it will be found to be absolutely neutral having a pH value of 7.0, to be reasonably free from moisture and to have a far higher stability than is possible by the use of the old customary sodium carbonate washes.

It will be understood that our invention from the broad standpoint contemplates the treatment of nitrated products, more particularly for their neutralization, with an alkaline salt solution of a character such that it will not release to the nitrated product any substance which will promote decomposition of the nitrated product and which will not act to effect substantial saponification of the nitrated product, or in other words, will have a pH value during the major portion of the treatment within about the range 12.0–8.3.

It will be further understood that in the carrying out of our invention we may use various salts and mixtures of salts, other than that specifically mentioned herein, which may be readily determined by those skilled in the art and it will be understood that where in the claims appended hereto we refer to trisodium phosphate, we intend to include as equivalents sodium borate, sodium tetraborate, sodium metaborate, and the like, or operable equivalents therefor, and where in the claims appended hereto we refer to mixtures of trisodium phosphate and sodium tetraborate, we intend to include operable equivalent mixtures.

Having now fully described our invention, what we claim and desire to protect by Letters Patent is:

1. The method of purifying an aliphatic organic nitrate carrying residual acid which includes treating the nitrate with an alkaline salt solution which during a major part of the treatment will have a pH value within about the range 12.0–8.3.

2. The method of purifying nitroglycerin, which includes treating the nitroglycerin with an alkaline salt solution which will have a pH value not in excess of 12.0 and not below about 8.3 during the major part of the treatment of nitroglycerin while avoiding any substantial reaction with the nitroglycerin.

3. The method of purifying an aliphatic organic nitrate carrying residual acid, which includes treating the nitrate with an alkaline salt solution including a plurality of salts of such a character and in such proportions that the solution will have a pH value within about the range 12.0–8.3 during a major part of the treatment of the nitrate.

4. The method of purifying nitroglycerin, which includes treating the nitroglycerin with an alkaline salt solution including a plurality of salts of such a character and in such proportions that the solution will have a pH value within about the range 12.0–8.3 during a major part of the treatment of the nitroglycerin.

5. The method of purifying an aliphatic organic nitrate carrying residual acid, which includes treating the nitrate with an alkaline salt solution including a plurality of salts of such a character and in such proportions that the solution will have a pH value within about the range 12.0–8.3 during a major part of the treatment of the nitrate while avoiding any substantial reaction with the nitrate.

6. The method of purifying nitroglycerin, which includes treating the nitroglycerin with an alkaline salt solution including a plurality of alkaline salts of such a character and in such proportions that the solution will have a pH value within about the range of 12.0–8.3 during a major part of the treatment of nitroglycerin while avoiding any substantial reaction with the nitroglycerin.

7. The method of purifying an aliphatic organic nitrate carrying residual acid, which includes treating the nitrate with a dilute solution containing a soluble tribasic phosphate.

8. The method of purifying nitroglycerin, which includes treating the nitroglycerin with a dilute solution containing a soluble tribasic phosphate.

9. The method of purifying an aliphatic organic nitrate carrying residual acid of the character described, which includes treating the nitrate with an alkaline salt solution having a pH value within about the range 12.0–8.3 during the major part of the treatment, and which contains a plurality of alkaline salts one of which is a soluble tribasic phosphate.

10. The method of purifying nitroglycerin, which includes treating the nitroglycerin with an alkaline salt solution having a pH value within about the range 12.0–8.3 during the major part of the treatment, and which contains a plurality of alkaline salts one of which is a soluble tribasic phosphate.

11. The method of purifying an aliphatic organic nitrate carrying residual acid, which includes treating the nitrate with a soluble tribasic phosphate and a soluble tetraborate in solution.

12. The method of purifying nitroglycerin, which includes treating the nitroglycerin with a solution of a soluble tribasic phosphate and a soluble tetraborate.

13. The method of purifying an aliphatic organic nitrate carrying residual acid of the character described, which includes treating the nitrate with a solution containing trisodium phosphate within the range about 5 parts to 8 parts and sodium tetraborate within the range about 5 parts to 2 parts.

14. The method of purifying an aliphatic organic nitrate carrying residual acid, which includes treating the nitrate with a dilute solution containing trisodium phosphate.

15. The method of purifying nitroglycerin, which includes treating the nitroglycerin with a dilute solution containing trisodium phosphate.

16. The method of purifying an aliphatic organic nitrate carrying residual acid of the character described, which includes treating the nitrate with an alkaline salt solution having a pH value within about the range 12.0–8.3 during the major part of the treatment, and which contains a plurality of alkaline salts one of which is trisodium phosphate.

17. The method of purifying nitroglycerin, which includes treating the nitroglycerin with an alkaline salt solution having a pH value within about the range 12.0–8.3 during the major part of the treatment, and which contains a plurality of alkaline salts one of which is trisodium phosphate.

18. The method of purifying an aliphatic organic nitrate carrying residual acid, which includes treating the nitrate with trisodium phosphate and sodium tetraborate in solution.

19. The method of purifying nitroglycerin, which includes treating the nitroglycerin with trisodium phosphate and sodium tetraborate in solution.

In testimony of which invention, we have hereunto set our hands, at Kenvil, N. J., on this 2nd day of May, 1928.

SERENO G. NORTON.
NEWTON C. BOYD.